United States Patent [19]

Miller

[11] 4,445,829
[45] May 1, 1984

[54] APPARATUS FOR DAMPENING PUMP PRESSURE PULSATIONS

[76] Inventor: James D. Miller, 9218 Alta Oaks Dr., Dallas, Tex. 75243

[21] Appl. No.: 401,959

[22] Filed: Jul. 26, 1982

Related U.S. Application Data

[63] Continuation-in-part of Ser. No. 216,161, Dec. 15, 1980, abandoned.

[51] Int. Cl.³ ............................................. F04B 11/00
[52] U.S. Cl. .................................. 417/543; 137/568; 138/30
[58] Field of Search ................ 417/540, 543, 269; 138/26, 30; 137/568, 569

[56] References Cited

U.S. PATENT DOCUMENTS

| | | | |
|---|---|---|---|
| 2,094,457 | 9/1937 | Lattner | 137/78 |
| 2,347,379 | 4/1944 | Teeter | 138/30 |
| 2,485,752 | 10/1949 | Laspe et al. | 103/224 |
| 2,530,190 | 11/1950 | Carver | 138/26 |
| 2,773,455 | 12/1956 | Mercier | |
| 2,896,862 | 7/1959 | Bede | 239/332 |
| 3,486,530 | 12/1969 | Mercier | 138/30 |
| 3,693,348 | 9/1972 | Mercier | 60/51 |
| 4,032,265 | 6/1977 | Miller | 417/540 |
| 4,190,403 | 2/1980 | Glover | 417/543 |

Primary Examiner—Richard E. Gluck
Assistant Examiner—Donald E. Stout
Attorney, Agent, or Firm—Hubbard, Thurman, Turner & Tucker

[57] ABSTRACT

A pressure pulsation dampener particularly adapted for use in connection with positive displacement reciprocating plunger pumps comprising a pressure vessel adapted to be connected to the pump discharge flow line and having a liquid volume capacity sufficient to reduce the flow velocity of the liquid entering the vessel by approximately 85%. The liquid volume capacity of the tank is preferably at least 5% of the discharge liquid volume flow rate of the pump wherein the units of volume are the same and the unit of time of liquid flow rate is the minute. The tank includes a gas volume portion formed by a bulkhead in the tank, an inflatable flexible bladder disposed in the flow path of the fluid flowing through the pulsation dampener or an elongated tube in which a gas-liquid interface is maintained. The pulsation dampener is particularly adapted for use in hydraulic systems subjected to a substantial discharge static head imposed on the pump and resulting from a vertical change in elevation of the discharge flow line.

4 Claims, 7 Drawing Figures

APPARATUS FOR DAMPENING PUMP PRESSURE PULSATIONS

CROSS REFERENCE TO RELATED APPLICATION

This application is a continuation in part of Application Ser. No. 216,161, filed Dec. 15, 1980, now abandoned.

BACKGROUND OF THE INVENTION

1. Field of the Invention

This invention pertains to apparatus and a method for reducing pressure pulsations in liquid conduit systems connected to positive displacement pumps and the like.

2. Background Art

In the art of controlling pressure pulsations and vibrations resulting therefrom in hydraulic systems a number of devices have been developed which are adapted primarily to control pressure variations resulting from sudden changes in flow rate of fluid through the system. For example, in the discharge piping system connected to positive displacement pumps it is known to use pressure pulsation dampeners which are adapted primarily to reduce the time spaced pressure pulses resulting from flow variations caused, for example, by single and multicylinder reciprocating plunger pumps. The discharge flow stream from a reciprocating plunger type is not at a continuous rate due to the basic mechanism of reciprocating piston or plunger type pumps. Although multicylinder plunger pumps with three or more cylinders have been developed to provide for smoother and more continuous discharge flow, pressure pulsations resulting from flow variations which cannot be totally eliminated cause vibrations and disturbances in the piping system which can ultimately damage the discharge flow pipe or other components of the system as well as the pump itself.

In this regard a number of pressure pulsation dampening devices have been developed. One of the most common types of pressure pulsation control devices comprises a relatively small pressure vessel interposed in the pump discharge pipe as an appendage or branch conduit and being provided with a flexible gas filled bladder contained therein. The bladder contracts and expands in response to changes in pressure and flow in the pipeline and in the pressure vessel to reduce the flow variations and associated pressure pulsations. Pressure pulsation dampeners utilizing a pressure vessel partially filled with compressed gas and being in communication with the pump discharge line have also been used to reduce pressure pulsation induced vibrations in positive displacement pump systems. This type of pulsation dampener has been largely replaced by the elastic diaphragm or bladder type described above due to the fact that the liquid in the system tends to absorb the gas in the vessel and, depending on the type of liquid being pumped, a gas compatible with the liquid is not always readily available or easily used with such systems.

Efforts to control flow induced pressure pulsations in hydraulic systems which include positive displacement pumps have also lead to the development of the so called acoustical or reaction type pulsation dampeners. Such type of dampeners, however, are effective only when designed for a rather specific hydraulic system including pressure, flow, fluid density and physical characteristics of the piping system downstream of the pump. Accordingly, such types of pulsation dampeners must be tailored to specific pump operating conditions and lose their effectiveness when system parameters are subject to moderate or significant variations. Moreover, acoustic type pulsation dampeners as well as certain flexible bladder type dampeners, if not properly sized, can contribute to pressure losses in the system with which they are used.

Although a great deal of effort has been focused on reducing flow induced pressure pulsations in hydraulic systems using positive displacement pumps, it has been observed that in many hydraulic systems certain pressure pulsations persist in the flow conduit or piping downstream of the dampener even though high amplitude flow induced pulsations may be adequately attenuated. In some hydraulic systems these undampened or so called residual pulsations are not of an amplitude sufficient to cause damage to the pump or the pipe network downstream thereof. In fact, many residual pressure pulsations and related vibrations appear to be related to pump speed and flow variations inherent in the operation of positive displacement pumps. Although some of these residual or secondary pressure pulsations cannot be dampened by conventional diaphragm, bladder and acoustic type dampeners they are sometimes successfully dampened by the use of baffles in the flow path of the discharge liquid.

However, it has been observed that some types of hydraulic systems resist the attenuation of certain pressure pulsations of relatively high amplitude at frequencies which do not appear to be related to flow variations resulting from actual pump design or operating characteristics. It has been discovered in pursuing the present invention that hydraulic systems which include positive displacement pumps, particularly of the reciprocating plunger type, are subject to damaging vibrations caused by pressure pulsations which are created by the acceleration and deceleration (negative acceleration) of the liquid at the beginning and end of the delivery stroke of the pump plunger, respectively. Moreover, acceleration induced pressure pulsations are not reduced by increasing the number of pump cylinders and plungers and tend to become a greater factor in the overall pressure pulsation phenomena in multicylinder pumps and high speed pumps. Although these acceleration induced pressure pulsations have been observed to be particularly significant in hydraulic systems utilizing positive displacement reciprocating plunger pumps, it is contemplated that other types of positive displacement pumps such as rotary gear, vane and helical screw types as well as so called axial piston types may, under certain conditions, require attenuation of flow acceleration induced pressure pulsations.

Moreover, these so called acceleration induced pressure pulsations appear to be much more pronounced and difficult to control in hydraulic systems where at least a portion of the discharge "head" or pressure is due to a vertical column of liquid and not as a result of friction or throttling losses in a pipe network. In other words in installations where a constant static head is present at the pump discharge flange regardless of pump discharge flow rate the secondary or acceleration generated pressure pulsations are of a significant magnitude and largely resist attenuation by known types of pulsation control equipment. It has also been determined that pumps operating with high density fluids such as well drilling muds and coal or iron ore slurries are also subjected to more pronounced magnitudes of acceleration induced pressure pulsations, and that these pulsations are generally proportional to fluid density.

SUMMARY OF THE INVENTION

The present invention provides an improved pressure pulsation dampener for hydraulic systems utilizing positive displacement pumps wherein pressure fluctuations in the discharge line of such pumps are reduced to minimize damaging vibrations. In accordance with one aspect of the present invention it has been discovered that certain pressure pulsations of significant magnitude and frequency may be attenuated by providing an enlarged volume chamber in the discharge piping downstream of the pump, which chamber is of a relatively critical size range so as to result in a substantial reduction in the velocity of the fluid being discharged from the pump.

It has been further determined in accordance with the present invention that the provision of an enlarged volume chamber in the form of a pressure vessel having an inlet and outlet arranged to provide for flow of liquid substantially through the vessel, as opposed to forming the vessel as an appendage, is capable of reducing substantially all pressure pulsations generated by the pump to an insignificant level as regards the affect of such vibrations on the mechanical health of the equipment and piping. Such a pulsation dampener, if also provided with a flexible member having a bulk modulus less than the liquid being pumped and being disposed in the main discharge flow stream, is capable of dampening not only the flow induced pressure pulsations but also the heretofore nonattenuable residual pressure pulsations which are induced by acceleration and deceleration of the liquid during the delivery stroke of, for example, a reciprocating plunger type pump.

In accordance with another aspect of the present invention it has been determined that by providing a pressure vessel or tank disposed preferably immediately downstream of the discharge flange of a pump, having a volumetric capacity at least 5% of the liquid volume flow rate of the pump, that substantial pressure pulsation dampening and flow equalization may be provided in a wide variety of hydraulic systems utilizing positive displacement pumps. A preferred size for the dampener vessel or tank for most liquid transport applications requires a total volume capacity of approximately 10% of the liquid volume flow rate through the tank wherein the units of volume for the tank and the flow rate are the same and the unit of time for the flow is the minute.

In accordance with another aspect of the present invention it has been determined that providing an enlarged volume chamber in the discharge line of a positive displacement reciprocating plunger pump which will result in a reduction in flow velocity within the chamber of approximately 85% of the average velocity in the liquid flow line will produce suitable attenuation of a wide range of pressure pulsations which appear to be pump generated.

Still further in accordance with the present invention there is provided an improved pressure pulsation dampener comprising a vessel or tank including a flexible component having a bulk modulus less than that of the liquid being pumped through the dampener. The flexible component may be a gas filled bladder disposed within a protective shell or cage and positioned within the pulsation dampener vessel or tank so as to be directly exposed to the main flow stream of liquid passing through the dampener from the pump discharge line to the system flow line. Alternatively, the flexible component or bladder may be housed in an auxiliary chamber or housing connected directly to the main dampener vessel or tank.

Although the flexible component can be a gas filled bladder or membrane separating the liquid from the gas volume, the present invention also contemplates the provision of a dampener vessel or tank having a configuration which provides a certain portion of the tank to be filled with a pressure gas and wherein the surface area of the gas-liquid interface may be maintained at a minimum by positioning the interface within an elongated tube extending within the liquid chamber portion of the vessel or tank. The volume of gas may be varied by precharging the gas chamber portion of the dampener vessel to selectively dampen certain residual pressure pulsations at frequencies which are otherwise unattenuable by known pulsation dampening techniques.

In accordance with yet another aspect of the present invention an improved method has been developed for controlling pressure pulsations in hydraulic systems which include positive displacement pumps working against a so called static head and, in particular, a head at least partially caused by a vertical column of liquid. In accordance with the present invention it has been determined that by providing a lumped volume enlargement in the discharge line of a positive displacement pump working against a static head created by a vertical column of fluid that undesirable pressure pulsations may be significantly damped. The pulsation control method of the present invention also contemplates that the reduction in nominal discharge liquid flow velocity on the order of 85% near the pump discharge flange will significantly reduce pressure pulsations in the hydraulic system including the vertical flow lines. It has further been determined in accordance with the present invention that the dampening of pressure pulsations in hydraulic systems having a static head such as the type generated solely by a vertical column of liquid cannot be effectively accomplished by flexible diaphragm or bladder type pressure pulsation dampeners. It has still further been determined that the degree of pressure pulsation attenuation accomplished by liquid volume enlargement is proportional to the percentage of the head generated by a static vertical head or back pressure as opposed to pressure resulting from flow resistance in the system.

Accordingly, the present invention provides improved apparatus and methods for dampening pressure pulsations in hydraulic systems which are flow induced as well as pulsations or perturbations which appear to be unrelated to speed or design characteristics of certain types of pumps. The apparatus and method of the present invention is particularly adapted for use in connection with hydraulic systems employing positive displacement reciprocating plunger pumps in applications involving a relatively high static head on the pump discharge side, and in applications involving the pumping of dense slurries. However, it is contemplated that the present invention may be useful in connection with other applications of reciprocating plunger pumps and with other types of pumps.

DESCRIPTION OF THE PREFERRED EMBODIMENTS

The present invention has been developed as a result of efforts to solve problems associated with hydraulic systems wherein a static head or pressure is present at the discharge flange of a positive displacement pump, in particular, a multicylinder reciprocating plunger pump or pumps. One type of hydraulic system where a static head of relatively high pressure is present in the pump discharge flow path is that wherein the pump is discharging into a vertical line or conduit of substantial length. There are a number of pump applications wherein this type of pumping condition is experienced. For example, in systems involving the dewatering of deep mines and/or the pumping of fluids from a lower elevation to a higher elevation over a long distance, such as in liquid or slurry pipelines, a substantial vertical change in elevation will cause a static pressure or "head" at the pump which may be as great as several thousand pounds per square inch. Although certain applications requiring the pumping of liquids against a vertical static head may be severed by substantially continuous flow pumps, such as centrifugal or axial flow types, these pumps are not suited for pumping liquids which contain particulate material. Accordingly, it has been found necessary to utilize positive displacement pumps and in particular reciprocating plunger pumps for such applications as hydraulic slurry systems and mine dewatering systems wherein the pumped liquid includes a substantial quantity of solids.

Figure 1:
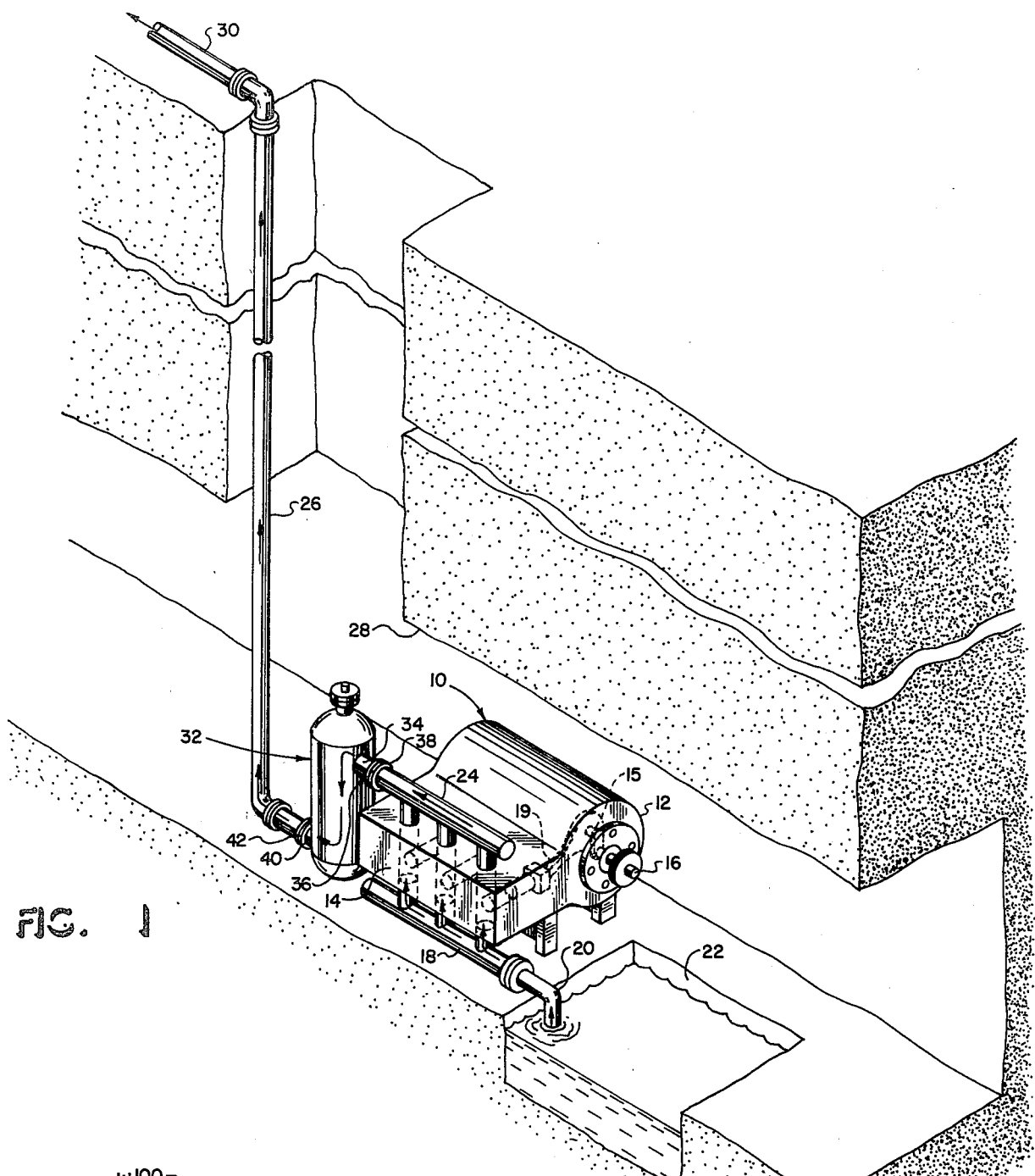
FIG. 1 is a perspective view of a typical hydraulic system employing a positive displacement pump of the reciprocating plunger type and including the improved pressure pulsation dampener of the present invention interposed in the discharge flow line.

Referring to FIG. 1, there is illustrated a typical hydraulic system involving a requirement to pump a liquid a substantial vertical distance thereby creating a constant static head or back pressure in the pump discharge flow line against which the pump must work continuously. FIG. 1 illustrates a positive displacement pump of the multicylinder reciprocating plunger type, generally designated by the numeral 10. The pump 10 is illustrated as a triplex single acting plunger type and includes a power frame 12 and a fluid end or housing 14. The pump includes a crankshaft 15 having an input portion 16 which may be suitably drivably connected to a prime mover, not shown. The crankshaft 15 is operable to reciprocate one or more plungers 17 through a connecting rod and crosshead mechanism 19, for example. The pump 10 includes an inlet manifold 18 which is in flow communication with a suction line 20 for receiving inlet liquid from a source such as a water collection pit 22 disposed in a deep mine. The suction line 20 may also include suitable charging pump means, not shown, for drawing water from the pit 22 to assure that the pump 10 is at all times sufficiently charged with liquid through the inlet manifold to minimize the risk of cavitation and reduction of volumetric efficiency. The pump 10 also includes a discharge manifold 24 for receiving pumped liquid from each of the respective plunger cylinders, only one of which is illustrated by way of example in FIG. 1. The discharge manifold 24 is adapted to be in flow communication with a discharge flow line 26 having a substantial vertical run from the deep mine shaft 28 to a surface discharge point 30 indicated schematically in FIG. 1.

By way of example, as a result of extensive testing of pressure pulsation devices in a mine dewatering system having a vertical run of approximately 1,800 feet from the pump location in the mine to the surface discharge point, it has been determined that heretofore known types of pressure pulsation dampeners are substantially ineffective in reducing the peak to peak flow line pressure variations resulting from operation of positive displacement reciprocating plunger pumps. In fact, known types of pressure pulsation dampeners in one particular test system having the vertical run indicated herein resulted in a total attenuation of the peak to peak discharge pressure of a maximum of only 30%. However, the same system using a pressure pulsation dampener in accordance with the present invention experienced a 75% attenuation of the peak to peak pressure variations as compared with the pressure variation resulting from no discharge pressure dampener of any type being present in the discharge system.

A preferred embodiment of the improved pressure pulsation dampener of the present invention is illustrated in FIG. 1 and generally designated by the numeral 32. The pressure pulsation dampener 32 which also functions somewhat as a flow equalizer, is characterized by a pressure vessel forming an enlarged volume chamber interposed in the discharge flow conduit system preferably immediately downstream of the pump 10. The pulsation dampener 32 includes an inlet conduit portion 34 having a mounting flange 36 adapted to be connected to a pump discharge manifold flange 38. Accordingly, the pulsation dampener 32 is mounted directly adjacent to the pump 10 which is the preferred location for most applications of the dampener. The dampener 32 also includes a discharge conduit portion 40 having a flange 42 adapted to connect the pulsation dampener to the discharge flow line 26 in a conventional manner.

Figure 2:
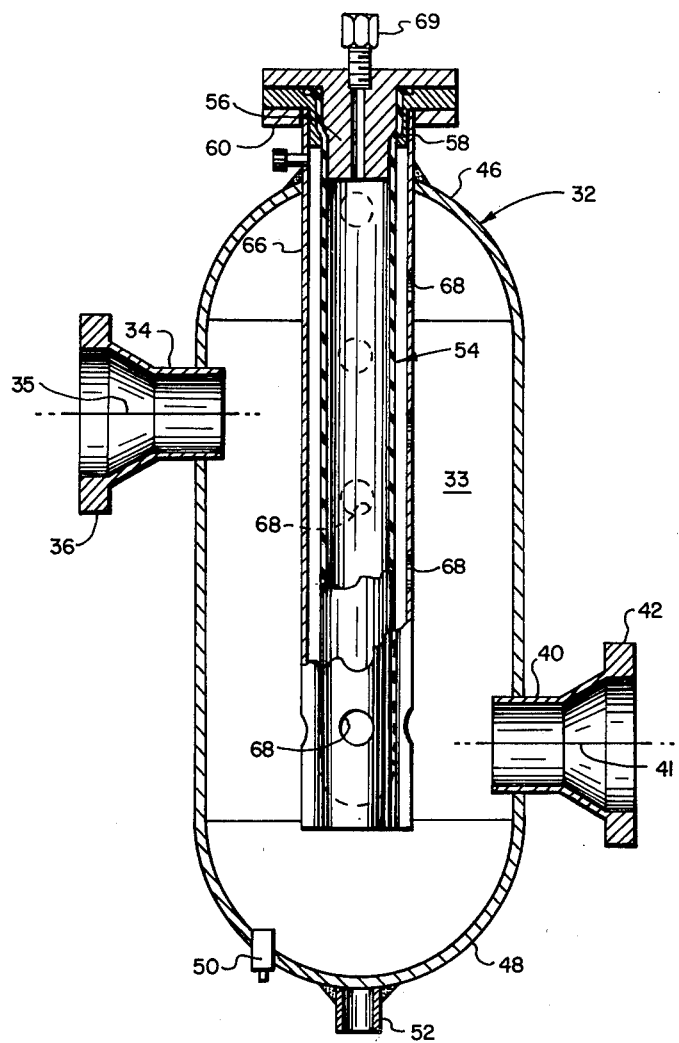
FIG. 2 is a vertical longitudinal section view of one embodiment of the pressure pulsation dampener of the present invention.

Referring also to FIG. 2, the pulsation dampener 32 is illustrated in vertical longitudinal section. The dampener 32 comprises a generally cylindrical tank or pressure vessel 44 having substantially elliptical upper and lower head portions 46 and 48 collectively defining a volume chamber 33. The tank 44 may be fabricated of suitable steel according to approved pressure vessel codes and may be of a configuration other than cylindrical. The tank 44 also includes the inlet conduit 34 and discharge conduit portion 40, as shown, together with their respective flange portions 36 and 42. As illustrated in FIG. 2, the location of the inlet conduit 34 is arranged to be vertically displaced from the discharge conduit portion 40. It has been determined that it is important to arrange the location of the respective inlet and discharge conduit portions so that they are not directly in line with each other. In fact, in a preferred embodiment of the present invention having a 100 gallon volumetric capacity, the tank 44 has a diameter of approximately 24 inches and the longitudinal centerlines of the respective inlet and discharge conduit portions 34 and 40 are displaced vertically from each other by a distance of at least 24 inches. Although it is preferred that the conduit portions 34 and 40 be positioned out of line with each other by displacing one conduit with respect to the other along the tank 44 it is possible to obtain satisfactory performance of the pulsation dampener 32 by placing the inlet and outlet conduits in line with each other and utilizing a suitable baffle to prevent direct line of sight communication between the respective conduit portions. The tank 44 also includes a suitable drain plug 50 and may be provided with a variety of mounting or support members including a support socket 52, as illustrated in FIG. 2.

In applications of the pressure pulsation dampener 32 to hydraulic systems which have a constant discharge pressure or head created primarily by a vertical column of liquid or resulting from conditions other than frictional and throttling losses in the discharge flow line the proper sizing of the volume chamber 33 is basically all that is required to provide effective pressure pulsation dampening resulting from acceleration and deceleration of the fluid by the pump. Some flow variation induced pulsation attenuation is, however, obtained by selection of the chamber volume. However, many hydraulic systems present an impedence to flow or cause a discharge pressure resulting from a combination of factors wherein the dampening of flow induced pressure pulsations is also desirable.

Accordingly, the pulsation dampener 32 may be provided with a suitable flexible member disposed within the tank 44, which member should have a bulk modulus less than the liquid being pumped. The flexible member may be, for example, a closed thin walled steel tube not unlike a bourdon tube, or a closed cell rubber or plastic structure. Moreover, the flexible member may also be a gas charged flexible bladder, as illustrated in FIG. 2, and generally designated by the numeral 54. In the development of the pulsation dampener 32 it has been determined that the placement of the flexible member such as the bladder 54 in the main flow stream between the inlet conduit 34 and discharge conduit 40 is beneficial in reducing the magnitude of the flow induced pressure pulsations although other configurations have been determined to be effective as will be described further herein. The bladder 54 is preferably formed of a suitable elastic material such as synthetic rubber or the like of suitable thickness to withstand the cyclic pressure variations as well as the total pressure of the system. The bladder 54 is characterized by an elongated tubular member suitably fastened at its upper end between a mandrel 56 and a flanged collar 58, the latter being mounted on a flange 60. The flange 60 is suitably fastened directly to an elongated tubular shell 66 which extends into the interior 33 of the vessel and forms a protective cage for the bladder 54. The tubular shell 66 includes a plurality of spaced apart perforations or openings 68 within the chamber 33 to provide for liquid to contact the bladder 54. It is preferably that the openings 68 are arranged such that they are not in direct alignment with the inlet conduit 34 to prevent the bladder 54 from being impinged by particulate matter entrained in the liquid flow stream entering the chamber 33 from the inlet conduit. The mandrel 56 includes a suitable charging valve 69 for charging the interior of the bladder 54 with a pressure gas so that the bladder may be elastically flexed or collapsed partially to absorb pressure pulsations resulting primarily from flow variations through the chamber 33.

As indicated herein it has been determined that it is important to place the bladder 54 in the chamber 33 in such a way as to be interposed in the main flow stream of liquid flowing through the tank 44 from the inlet conduit 34 to the discharge conduit 40. Accordingly, it is preferred to provide for the bladder 54 to extend over a substantial portion of the flow path of liquid passing through the pulsation dampener 32 and, as shown in FIG. 2, the bladder extends between the longitudinal central axes 35 and 41 of the respective conduit portions 34 and 40.

In contrast with known parameters concerning pressure pulsation dampeners, used on both the inlet and discharge sides of positive displacement pumps, it has been determined in accordance with the development of the present invention that the liquid volume capacity of a pressure pulsation dampener for attenuating discharge pressure pulsations resulting from acceleration of the liquid should be at least approximately 5% of the liquid discharge flow rate of the pump. An upper limit of volumetric capacity could be as great as at least 50% of liquid flow rate depending on the degree of dampener effectiveness required. It is indicated that a range of 5% to 25% will meet the requirements or many applications. A preferred volumetric capacity of a pressure pulsation dampener in accordance with the present invention for primarily liquid transport applications is indicated to be approximately 10% of the nominal volumetric flow rate of the hydraulic system in which the dampener is disposed. By way of example, a hydraulic system having a nominal volumetric flow rate of 1,000 gallons per minute could be adequately served by a puslation dampener having a 100 gallon liquid volume capacity.

In accordance with the present invention in sizing the volumetric capacity of the vessel or tank the volume occupied by the flexible member such as the bladder 54 is normally not considered as long as the total liquid volumetric capacity of the vessel is at least 5% of the liquid flow rate. The volume occupied by the flexible member may range from 5% to 20% of total volume, however.

It has also been determined that the liquid flow velocity entering the pressure pulsation dampener should be reduced by approximately 85% within the pulsation dampener to provide effective attenuation of acceleration induced pressure pulsations. A pulsation dampener constructed generally of the configuration illustrated in FIG. 2 and having a liquid volume capacity in accordance with the above indicated parameters will produce such a flow velocity reduction within the interior of the dampener. It will, however, be appreciated by those skilled in the art that various other physical configurations of a pressure pulsation dampener in accordance with the present invention may be provided. For example, the pulsation dampener may be formed as part of the pump discharge manifold itself such as the manifold 24 illustrated for the pump 10 in FIG. 1. As long as the volume capacity of the dampener is within the desired range indicated, and preferably has inlet and outlet conduits arranged to require some redirection of the flow stream entering and leaving the pulsation dampener, effective attenuation of pressure pulsations resulting from fluid acceleration may be enjoyed.

Figure 3:
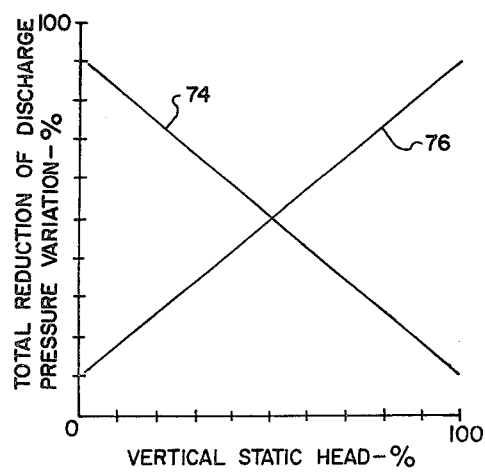
FIG. 3 is a diagram illustrating the relative effectiveness of two methods of pressure pulsation dampening in relation to the type of static head or pressure developed in a hydraulic system.

It has been discovered in developing the method of controlling pressure pulsations in a hydraulic system on the discharge side of a positive displacement pump that the effectiveness of a liquid volume chamber type pulsation dampener is directly related to the characteristics which provide the discharge head or back pressure imposed on the pump itself. Referring to FIG. 3, there is illustrated a graphical representation of the percentage of total pressure pulsation attenuation that may be accomplished by two basic pulsation control methods in relation to the percentage of discharge pressure head which is due to static pressure resulting from a vertical column of fluid which is generated with a change in elevation of the pump discharge hydraulic conduit system. In the graph shown in FIG. 3 the vertical scale indicates the percentage of peak to peak pressure variation reduction ranging from 0 to 100%. For example, a 100% pressure pulsation reduction would indicate no variation in the discharge pressure in the particular system and a 0% reduction would indicate the maximum peak to peak pressure pulsation or variation observed. The horizontal scale indicates the degree of discharge pressure or head imposed on the pump discharge flow resulting from a change in elevation or a vertical column of fluid creating the back pressure on the system. For example, a 100% value would indicate that all of the discharge pressure imposed on the pump was due to vertical elevation of the fluid in the discharge conduit system. A zero reading on the horizontal scale would indicate that none of the discharge pressure was due to a change in elevation or vertical column of fluid imposed on the system.

The line 74 indicates generally the degree of attenuation of pressure pulsations which may be accomplished with pulsation dampener utilizing primarily a flexible diaphragm or bladder disposed in a pressure vessel of either the so called flow through or appendage type. As may be readily observed the degree of pressure pulsation attenuation decreases substantially linearly as the percentage of discharge pressure or head due to vertical column of fluid or change in elevation of the discharge flow stream increases. Accordingly, for a hydraulic system wherein the discharge pressure imposed on the pump is due substantially to pumping fluid through a vertical upward change in elevation the attenuation of flow indicated as well as acceleration induced pressure pulsations becomes negligible. However, as has been discovered in pursuing the present invention, the provision of an enlarged volume chamber in the discharge line, preferably immediately downstream of the pump, can result in substantial attenuation of pressure pulsations and which is particularly effective for systems wherein the discharge pressure is due to a vertical column of fluid or constant static head imposed on the pump.

The purely liquid volume chamber type of attenuator is, as indicated generally by the line 76 in FIG. 3, less effective for hydraulic systems where the discharge pressure is due substantially to friction and throttling losses in the hydraulic system downstream of the pump. Accordingly, a pressure pulsation dampener having both a properly sized liquid volume chamber and a flexible member or bladder can be provided which will result in optimum performance to dampen pressure variations in the system resulting from flow variations as well as acceleration of the liquid at the onset of delivery into the discharge line from the pump cylinders or expansible chamber. The lines 74 and 76 are not intended to indicate that the relationships illustrated are substantially linear for all systems.

Figure 4:
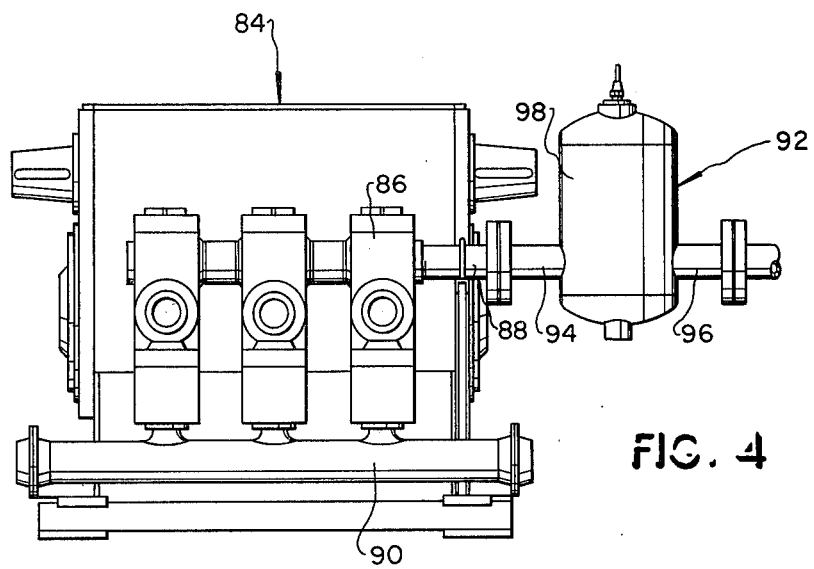
FIG. 4 is a front elevation of a positive displacement pump including an alternate embodiment of the present invention.

In the further development of the present invention it has been determined that although the configuration of the pulsation dampener disclosed herein and described in conjunction with FIGS. 1 and 2 is capable of providing the desired attenuation for dampening of pressure pulsations, that other configurations of pulsation dampeners using the teachings of the present invention are also superior to prior art devices. Referring to FIG. 4 there is illustrated a front elevation of a triplex reciprocating plunger pump generally designated by the numeral 84 having a fluid end including a discharge manifold 86 and a discharge flow line 88. The pump 84 also includes an inlet manifold 90 of conventional construction. The pump 84 is equipped with a discharge pressure pulsation dampener in accordance with an alternate embodiment of the present invention and generally designated by the numeral 92. The pulsation dampener 92 includes an inlet conduit portion 94 and a discharge conduit portion 96 both formed integral with a pressure vessel or tank 98. The pulsation dampener 92 is configured to have the inlet and discharge conduits arranged in line with each other to simplify the plumbing of the discharge conduit system. The conduit sections 94 and 96 may be provided with conventional flanged ends for connection to the discharge flow line.

Figure 5:
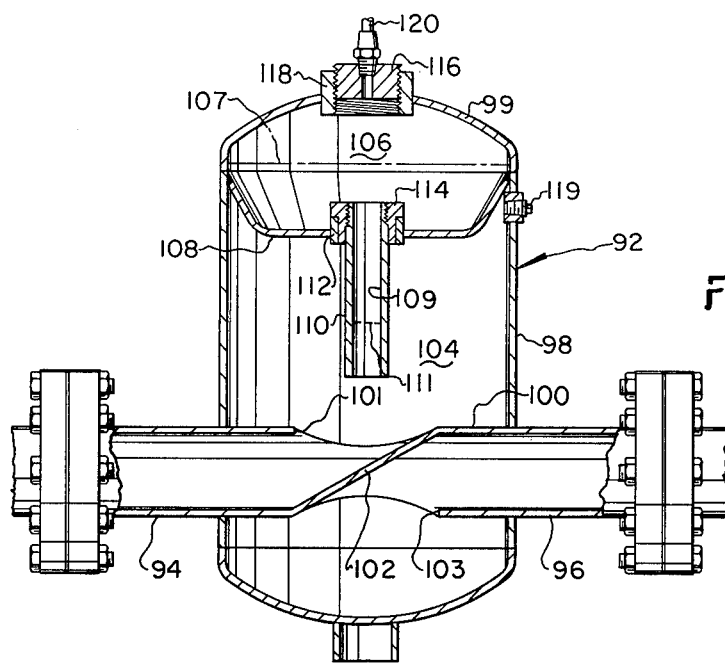
FIG. 5 is a central section view of the pulsation dampener shown in FIG. 4.

Referring now to FIG. 5 the pulsation dampener 92 is shown in central longitudinal section and illustrating that the inlet and discharge conduit sections 94 and 96 may be integrally formed of a single section of cylindrical pipe 100. The pipe section 100 includes opposed transverse openings 101 and 103 which are separated by a baffle 102 extending across the interior flow area of the pipe. Accordingly, liquid flowing through the inlet conduit section 94 flows into the interior chamber 104 of the tank 98 through the opening 101 and exits the chamber 104 into the conduit section 96 through the opening 103. The baffle 102 is operable to turn the fluid flow entering and leaving the chamber 104 and to deflect pressure waves traveling through the conduit sections 94 and 96.

The interior of the tank 98 is divided into the liquid volume chamber 104 and a gas volume chamber 106 by a bulkhead 108. A centrally disposed longitudinally extending conduit portion 110 extends vertically downward from the center of the bulkhead 108 passing through the bulkhead and mounted on a suitable fitting 112 formed integral with the bulkhead. The conduit portion 110 is characterized as a so called tuning port which has been found to be operable to control certain residual or secondary pressure pulsations experienced in some pump and piping systems. Conduit section 110 includes s flanged end portion 114 which may be provided with a tapered outer diameter which can be forcibly fitted in a cooperating bore in the fitting 112. The conduit section 110 can be interchanged with conduit sections of different diameter and length by removing a threaded plug 116 disposed in a fitting 118 formed as part of the tank head portion 99. The tank 98 also includes a vent port in the side wall thereof which is closed by a removable plug 119. Pressure gas may be introduced into the chamber 106 from a suitable source, not shown, through a conduit 120.

In the operation of the pulsation dampener 92 the chambers 106 and the extension thereof formed by the bore 109 may be filled with pressure gas to the extent that the gas-liquid interface at the nominal operating pressure of the system to which the dampener is connected is in the bore 109 such as indicated by the numeral 111. Accordingly, the surface area of liquid exposed to the pressure gas is substantially less than if the gas-liquid interface were in the chamber 106 although such a condition may exist depending on the operating pressure of the system, the degree of attenuation of flow and acceleration induced pulsations required and also due to the frequency range of these pulsations. Moreover, it has been determined that the ratio of gas volume to liquid volume can be varied to attenuate pressure variations in the conduit system to which the dampener is connected over a relatively broad range of pulsation frequencies. Basically the higher frequency pulsations are dampened by the liquid filled volume chamber 104 while the relatively low frequency pulsations are more effectively attenuated by the gas filled volume chamber 106. However, the parameters of liquid volume as a percentage of the flow rate through the dampener, and the percentage of the gas volume or flexible component volume to the total volume of the attenuator chamber 104 follows the relationships discussed herein for the embodiment of the invention described in conjunction with FIGS. 1 through 3. If the gas-liquid interface is to be maintained within the main portion of the chamber 106, as might be required for some applications, a flexible diaphragm member 107 could be used to eliminate gas-liquid contact over the relatively large surface area of the chamber. The head 99 could be suitably modified to be detachably secured to the main body of the tank 98 to provide for clamping the diaphragm 107 in the position shown.

Figure 6:
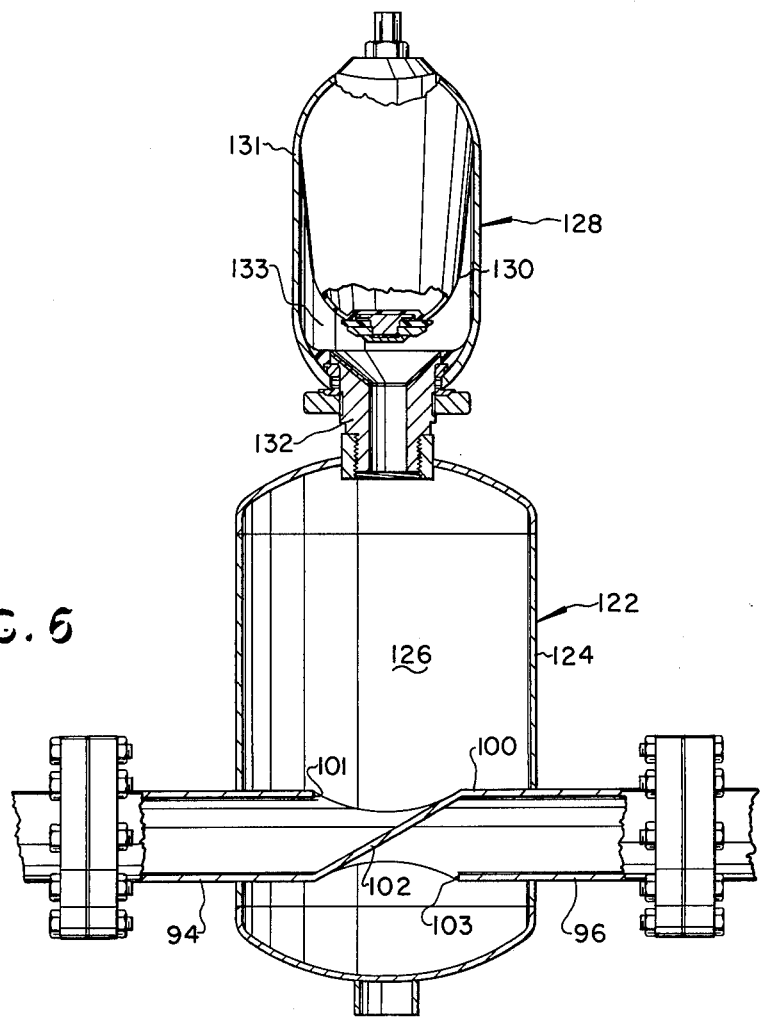
FIG. 6 is a central section view of a second alternate embodiment of a pulsation dampener.

FIG. 6 illustrates yet another alternate embodiment of the present invention wherein an attenuator 122 similar to the attenuator 92 is illustrated and is characterized by a closed pressure vessel or tank 124 having the inlet and discharge conduit arrangement 94 and 96 formed by the pipe section 100. The interior liquid volume chamber 126 of the tank 124 is in communication with an appendage vessel generally designated by the numeral 128 which may include a commercial flexible bladder type pressure pulsation dampener having a flexible internal component comprising a bladder 130 which is charged internally with pressure gas. Accordingly, the liquid volume of the pulsation dampener 122 is adapted to include the interior volume of a connecting conduit section 132 as well as the interior chamber 133 of the pressure vessel 131 for the appendage type dampener 128. The appendage type dampener 128 does not place the flexible component or member 130 directly in the flow path of the liquid passing through the dampener 122, in the manner according to the embodiment of FIG. 1; however, the importance of the actual presence of the gas volume chamber as compared to the particular location of the gas volume chamber in the dampener can be appreciated by the indicated effectiveness of the arrangement illustrated in FIG. 6. Tests on a triplex plunger pump operating at a nominal system discharge pressure of 1,000 psig have indicated a reduction in the peak to peak pressure variation approximately 51% as compared with no dampener. A dampener of the type illustrated in FIGS. 4 and 5 operating at the same conditions is capable of reducing the peak to peak pressure variations on the order of 76% at the same relatively high speed operation. At a relatively low speed operation the respective reductions in peak to peak pressure variations in the system downstream of the dampener were 75% and 85% respectively. The table below indicates values of peak to peak pressure variation reduction for pulsation dampeners of the type illustrated in FIGS. 5 and 6 placed in the discharge conduit of a Wilson-Snyder A600-PT reciprocating piston pump operating at speeds of approximately 60 rpm and 120 rpm with 6 inch diameter pistons and at a nominal discharge pressure of 1,000 psig. The respective dampeners 92 and 122 had a liquid chamber volume of approximately 20 gallons, a gas chamber volume of 2.4 gallons for the dampener 92 and gas chamber volume of a 2.5 gallons for the appendage type dampener 128. The conduit section 110 had nominal dimensions of 2.5 inches inside diameter and a length of 3 feet.

| | Peak to Peak System Pressure Variation Downstream Of Dampener - psig | |
|---|---|---|
| | nominal pump speed-rpm | |
| condition | 68 | 120 |
| no dampener | 165 | 195 |
| FIG. 5 dampener | 25 | 46 |
| FIG. 6 dampener | 39 | 80 |

Figure 7:
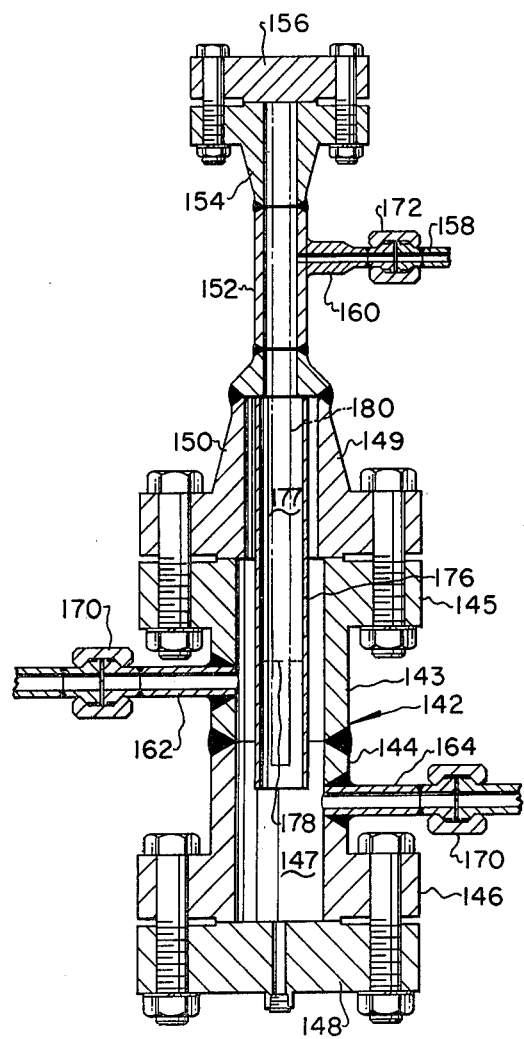
FIG. 7 is a central section view of a third alternate embodiment of a pulsation dampener in accordance with the present invention.

A third alternate embodiment of a pressure pulsation dampener in accordance with the present invention is illustrated in FIG. 7 and generally designated by the numeral 142. The pulsation dampener 142 is adapted for particularly high pressure and/or high temperature applications and includes a pressure vessel or tank made up to two opposed cylindrical members 143 and 144 having integral cylindrical flanges 145 and 146, respectively. The cylindrical members 143 and 144 form a liquid volume chamber designated by the numeral 147 which is closed at its opposite ends by respective flanges 148 and 149 which are suitably bolted to the flanges 146 and 145, respectively. The flange 149 may comprise a standard weld neck type flange and has an integral axial extension 150 which is welded to a further conduit section 152 and a smaller diameter weld neck flange 154 closed at its opposite end by a blind flange 156. The flanges 154 and 156 are suitably bolted together as shown.

A pressure gas inlet conduit 158 is connected to a stub conduit section 160 opening into the interior of the conduit 152. The inlet and discharge conduits for the dampener 142 are designated by the numerals 162 and 164, respectively, and are arranged in the general configuration of the arrangement of the inlet and discharge conduit for the pulsation dampener illustrated in FIGS. 1 and 2. Accordingly, the liquid volume chamber 147 is of the so called flow through type. Conduit sections 160, 162 and 164 are suitably connected to connecting conduit sections by suitable clamped type couplings designated by the numerals 170 and 172. The pulsation dampener 142 is provided with an elongated tuning port comprising a cylindrical tube or conduit section 176 extended into the liquid volume chamber 147 and contiguous with the conduit section 152. Accordingly, a gas-liquid interface, designated by the numeral 178, may be provided at a predetermined location within the tube 176 to provide the prescribed flexible component or gas volume portion of the interior chamber of the pulsation dampener. Pressure gas is introduced into the interior of the tube 176 through the conduit section 158-160. Accordingly, the entire interior volume of the tube 176 as well as the conduit section 152 and the flange 154 may comprise the gas volume chamber less the volume occupied by a suitable liquid level sensing device mounted within the interior 177 of the tube 176 and designated by the numeral 180 in FIG. 7. The liquid level sensing device 180 may be of a type commercially available such as a model 1-700-1-13 level sensor manufactured by Drexelbrook Engineering Co. of Horsham, Pa.

The pulsation dampener 142 may be charged with gas when the system is brought up to its operating pressure and the level or position of the gas-liquid interface 178 may be determined externally by reading a suitable instrument connected to the level sensing device 180. Accordingly, for a particular operating pressure condition of the system to which the pulsation dampener 142 is connected the gas volume may be preselected in accordance with the position of the interface 178.

From the foregoing it will be appreciated that the discovery of the present invention provides for improved pressure pulsation attenuation in hydraulic systems utilizing positive displacement reciprocating plunger pumps as well as certain other types of positive displacement pumps, particularly in applications wherein at least a portion of the total discharge pressure is created by a vertical head in the hydraulic system. As a result of the discovery of the present invention it is contemplated that certain hydraulic systems may be equipped with positive displacement reciprocating plunger pumps, which have a greater overall efficiency than substantially all other types of pumps in moderate to high pressure applications and low to relatively high flow rate applications, without concerns for vibration and other problems associated with pressure pulsations normally experienced with reciprocating pumps. Accordingly, reciprocating plunger pumps may be applied to a wider range of applications thereby reducing total energy requirements for certain types of hydraulic systems. Moreover, the pressure pulsation dampener of the present invention is operable to extend the life of the pump parts and the piping system. It is further contemplated that the present invention is particularly applicable to hydraulic systems where a vertical change in elevation of the discharge flow line is required. Such systems include mine dewatering and hydraulic slurry transport as well as a wide variety of liquid pumping applications wherein positive displacement reciprocating pumps are preferred for their economic and performance advantages.

Those skilled in the art will further appreciate that variations in the actual structural arrangement of a pressure pulsation dampener in accordance with the present invention may be made without departing from the scope and spirit thereof. The relationship of pulsation dampener liquid volume capacity to volume flow rate of the system as well as the flow velocity reduction values indicated herein are believed to be superior and critical to obtaining the desired results, although those skilled in the art will recognize that minor variations in the parameters may still yield favorable performance without departing from the scope of the invention delineated in the appended claims:

What I claim is:

1. In a hydraulic system including a positive displacement reciprocating plunger pump connected to a discharge flow line disposed to produce a static head at the pump due to a vertical change in elevation of said flow line, said head comprising a major portion of the liquid discharge back pressure imposed on said pump, the improvement comprising, a pressure pulsation dampener for reducing peak-to-peak hydraulic pressure pulsations in said flow line at least approximately 75% of peak-to-peak pressure pulsations observed without said dampener in said system resulting from flow variation of fluid discharged from said pump and from acceleration of said fluid through said flow line, said dampener including:

a generally cylindrical pressure vessel forming an enlarged volume chamber and interposed in the flow line immediately downstream of the pump discharge conduit, said pressure vessel including aligned inlet and discharge conduits opening into said enlarged volume chamber and including means interposed therebetween which together with the volume of said enlarged volume chamber reduces the flow velocity of liquid in said enlarged volume chamber by at least 85% of the average velocity in said flow line, a bulkhead disposed across the interior of said pressure vessel between at least a portion of a liquid volume chamber in said pressure vessel and a gas volume chamber in said pressure vessel, said gas volume chamber being defined in part by said pressure vessel, said liquid volume chamber having a volumetric capacity in the range of 5% to 10% of the liquid flow rate through said dampener wherein the units of volume of said liquid volume chamber and the flow rate are the same and the unit of time of the flow rate is one minute, and a tube elongated with respect to the thickness of said bulkhead extending through said bulkhead and being open to chamber portions formed in said enlarged volume chamber on both sides of said bulkhead, and said dampener is charged with pressure gas such that at the nominal working pressure of said system said gas volume chamber is maintained at 5% to 20% of said liquid volume chamber.

2. The invention set forth in claim 1 wherein:
an interface between said gas volume chamber and said liquid volume chamber is provided in said tube at the nominal working pressure of said dampener to minimize the liquid face area exposed to the gas in said gas volume chamber.

3. The invention set forth in claim 1 wherein:
said dampener includes a flexible membrane disposed across said pressure vessel bulkhead and said part of said pressure vessel defining part of said gas volume chamber and forming a common wall between said gas volume chamber and said liquid volume chamber.

4. In a hydraulic system including a positive displacement reciprocating plunger pump connected to a discharge flow line disposed to produce a static head at the pump due to a vertical change in elevation of said flow line, said head comprising a major portion of the liquid discharge back pressure imposed on said pump, the improvement comprising, a pressure pulsation dampener for reducing peak-to-peak hydraulic pressure pulsations in said flow line at least approximately 75% to peak-to-peak pressure pulsations observed without said dampener in said system resulting from flow variation of fluid discharged from said pump and from acceleration of said fluid through said flow line, said dampener including:

a generally cylindrical pressure vessel forming an enlarged volume chamber and interposed in the flow line immediately downstream of the pump discharge conduit, said pressure vessel including aligned inlet and discharge conduits opening into said enlarged volume chamber and including means interposed therebetween which together with the volume of said enlarged volume chamber reduces the flow velocity of liquid in said enlarged volume chamber by at least 85% of the average velocity in said flow line, said inlet and discharge conduits of said dampener being formed by a continuous common conduit having a baffle disposed thereacross and between opposed inlet and discharge passages formed in the sidewall of said common conduit and opening into a liquid volume chamber in said pressure vessel, a bulkhead disposed across the interior of said pressure vessel between at least a portion of said liquid volume chamber in said pressure vessel and a gas volume chamber in said pressure vessel, said gas volume chamber being defined in part by said pressure vessel, said liquid volume chamber having a volumetric capacity in the range of 5% to 10% of the liquid flow rate through said dampener wherein the units of volume of said liquid volume chamber and the flow rate are the same and the unit of time of the flow rate is one minute, and an elongated tube extending through said bulkhead and being open to chamber portions formed in said enlarged volume chamber on both sides of said bulkhead, and said dampener is charged with pressure gas such that at the nominal working pressure of said system said gas volume chamber is maintained at 5% to 20% of said liquid volume chamber.

* * * * *